US007010206B1

(12) United States Patent
Baker et al.

(10) Patent No.: US 7,010,206 B1
(45) Date of Patent: Mar. 7, 2006

(54) COATED OPTICAL FIBER AND OPTICAL FIBER COATING SYSTEM INCLUDING A FAST-GELLING PRIMARY COATING

(75) Inventors: Linda S. Baker, Addison, NY (US); Kevin R. McCarthy, Horseheads, NY (US); Michael J. Winningham, Big Flats, NY (US); Lung-Ming Wu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/937,069

(22) Filed: Sep. 8, 2004

(51) Int. Cl.
*G00B 6/02* (2006.01)
*B05D 5/06* (2006.01)
*C03C 17/00* (2006.01)
*G02B 1/10* (2006.01)

(52) U.S. Cl. .................... 385/128; 385/127; 427/163.1
(58) Field of Classification Search ................ 385/127, 385/128; 427/163.1
See application file for complete search history.

(56) References Cited

U.S. PATENT DOCUMENTS

| | | | | |
|---|---|---|---|---|
| 5,712,035 A | * | 1/1998 | Ohtaka et al. ............... 428/378 |
| 6,136,880 A | | 10/2000 | Snowwhite et al. ........... 522/64 |
| 6,187,835 B1 | | 2/2001 | Szum et al. ................... 522/96 |
| 6,316,516 B1 | | 11/2001 | Chien et al. ................... 522/91 |
| 6,470,128 B1 | | 10/2002 | Khudyakov et al. ........ 385/128 |
| 6,489,376 B1 | | 12/2002 | Khudyakov et al. .......... 522/96 |
| 6,531,522 B1 | | 3/2003 | Winningham ................ 522/96 |
| 6,602,601 B1 | | 8/2003 | Fewkes et al. ............... 428/378 |
| 6,650,821 B1 | * | 11/2003 | Koyano et al. ............. 385/136 |
| 6,741,780 B1 | | 5/2004 | Vanpoulle et al. .......... 385/124 |
| 6,744,954 B1 | * | 6/2004 | Tanaka et al. ............... 385/113 |
| 2003/0100627 A1 | | 5/2003 | Bishop et al. ............... 522/153 |
| 2003/0149127 A1 | | 8/2003 | Jansen et al. ................ 522/178 |
| 2004/0022511 A1 | | 2/2004 | Eekelen et al. ............. 385/128 |

FOREIGN PATENT DOCUMENTS

WO    WO 99/52958    10/1999
WO    WO 02/070418    9/2002

OTHER PUBLICATIONS

Wilczak et al., "*Sensitization of Phosphine Oxide Photoinitiators with Optical Brighteners in Certain Graphic Arts Applications*", Proc. RadTech North America Conf. 2000, pps. 570-576.

Youngman et al., "*Evaluating Cross-Link Density in Model Polyurethane acrylate Coatings with $^1H$ and $^{13}C$ NMR Relaxation Measurements*" Polymer Preprints 2003, 44(1), pps. 350-351.

Decker et al., "*Kinetic Approach of $O_2$ Inhibition in Ultraviolet-and Laser-Induced Polymerizations*", Macromolecules, vol. 18, No. 6, 1985, pps. 1241-1244.

(Continued)

*Primary Examiner*—Brian Healy
*Assistant Examiner*—Charlie Peng
(74) *Attorney, Agent, or Firm*—Robert L. Carlson; James V. Suggs

(57) ABSTRACT

The present invention provides optical fiber coating systems and coated optical fibers. According to one embodiment of the invention, a coated optical fiber includes an optical fiber having a core and a cladding; and a primary coating encapsulating the optical fiber, the primary coating having a Young's modulus of about 5 MPa or less, the primary coating being the cured reaction product of a primary curable composition having a gel time less than about 1.4 seconds at a UV intensity of 3.4 mW/cm$^2$.

24 Claims, 3 Drawing Sheets

OTHER PUBLICATIONS

Wang et al., "*Photopolymerization of Methyl Methacrylate Using Benzoin Isopropyl Ether as Photoinitiator: Effect of Thiophenol Compounds*", Journal of Applied Polymer Science, vol. 47, pps. 1665-1672.

Hoyle et al., "*Photopolymerizationof 1,6-hexanediol diacrylate: the effect of functionalized amines*", Polymer, vol. 29, Jan. 1988, pps. 18-23.

Johnson, Robert W., "*Dynamic Mechanical Analysis of UV-Curable Coatings While Curing*", ANTEC 2003, pps. 1886-1892.

Miller et al., "*N-Vinylamides and Reduction of Oxygen Inhibition in Photopolymerization of Simple Acrylate, Formulations*", 2003 American Chemical Society, pps. 2-14.

Hoyle et al. "*The Effect of Aromatic Amines on the Photopolymerization of 1,6-Hexanediol Diacrylate*", Journal of Applied Polymer Science, vol. 33, 1987, pps. 2985-2996.

Gasper et al., "*Integrated Approach to Studying the Development and Final Network Properties of Urethane Acrylate Coatings*", Polymer Preprints 2003, 44(1), pps 27-28.

Lee et al., *A rheological characterization technique for fast UV-curable systems*, Progress in Organic Coatings 38 (2000), pps. 193-197.

* cited by examiner

COATED OPTICAL FIBER AND OPTICAL FIBER COATING SYSTEM INCLUDING A FAST-GELLING PRIMARY COATING

BACKGROUND OF THE INVENTION

1. Field of the Invention.

The present invention relates generally to optical fiber, and more particularly to coating systems for optical fiber and coated optical fibers.

2. Technical Background

Optical fiber has acquired an increasingly important role in the field of telecommunications, frequently replacing existing copper wires. This trend has had a significant impact in all areas of telecommunications, greatly increasing the amount of data that is transmitted. Further increase in the use of optical fiber is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber is typically made of glass, and usually has a polymeric primary coating and a polymeric secondary coating. The primary coating (also known as an inner primary coating), is typically applied directly to the glass fiber, and when cured forms a soft, elastic, compliant material encapsulating the glass fiber. The primary coating has a low Young's modulus, and serves as a buffer to cushion and protect the glass fiber during bending, cabling or spooling. The secondary coating (also known as an outer primary coating) is applied over the primary coating, and acts as a tough, protective outer layer that prevents damage to the glass fiber during processing, handling and use.

As the demand for optical fibers has increased, so has the desire to improve the processes used to make them. One common trend in the optical fiber industry has been the desire to draw optical fibers at increased speeds, thereby increasing the throughput of optical fiber manufacturing plants. However, the draw speed can be rate-limited by the step of curing the conventional polymeric coatings used to protect the fiber. One sign that a coating is applied to an optical fiber at a rate exceeding the coating's maximum draw speed is the presence of defects in the cured coating. There remains a need for optical fiber coatings that can be fully cured at higher draw speeds using standard optical fiber coating curing processes.

SUMMARY OF THE INVENTION

One embodiment of the present invention relates to a coated optical fiber including an optical fiber having a core and a cladding; and a primary coating encapsulating the optical fiber, the primary coating having a Young's modulus of about 5 MPa or less, the primary coating being the cured reaction product of a primary curable composition having a gel time less than about 1.4 seconds at a UV intensity of 3.4 mW/cm$^2$.

Another embodiment of the present invention relates to a method for coating an optical fiber including the steps of providing a bare optical fiber; coating the optical fiber with a primary curable composition having a gel time less than about 1.4 seconds at a UV intensity of 3.4 mW/cm$^2$; and curing the primary curable composition to form a primary coating encapsulating the optical fiber, the primary coating having a Young's modulus less than about 5 MPa.

Another embodiment of the present invention relates to a curable composition having a gel time less than about 1.4 seconds at a UV intensity of 3.4 mW/cm$^2$, wherein a substantially cured reaction product of the curable composition has a Young's modulus less than about 5 MPa.

The coated optical fibers, methods, and curable compositions of the present invention result in a number of advantages over prior art coated optical fibers, methods, and curable compositions. For example, the curable compositions of the present invention can be cured at high rates of speed to provide defect-free coated optical fibers, enabling the skilled artisan to increase the throughput of optical fiber manufacturing processes.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
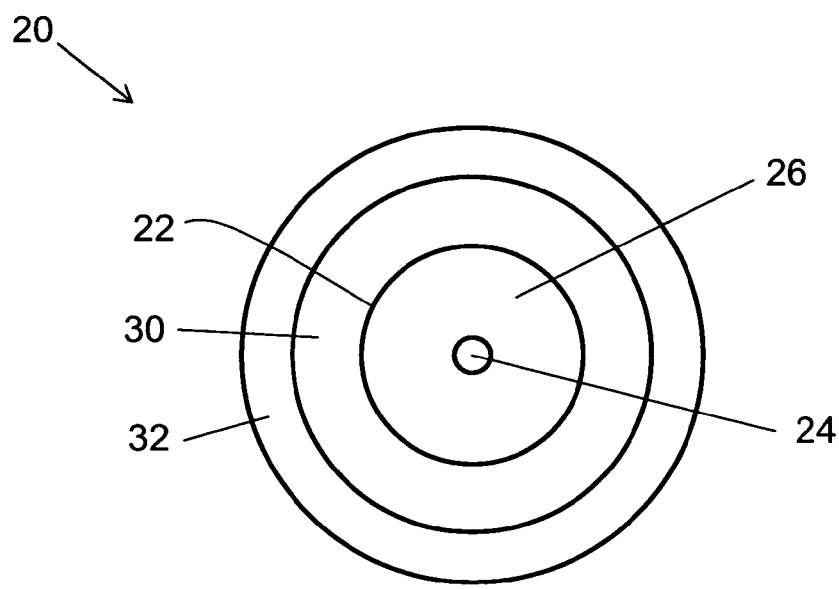
FIG. 1 is a schematic view of a coated optical fiber according one embodiment of the present invention.

One embodiment of the present invention relates to a coated optical fiber. An example of a coated optical fiber is shown in schematic cross-sectional view in FIG. 1. Coated optical fiber 20 includes an optical fiber 22 having a core 24 and a cladding 26; and a primary coating 30 encapsulating the optical fiber. Coated optical fiber 20 also includes a secondary coating 32 encapsulating the primary coating 30. In the coated optical fiber of FIG. 1, the primary coating 30 is applied directly to the surface of the optical fiber, and the secondary coating 32 is applied directly to the surface of the primary coating. As the skilled artisan will appreciate, in alternative embodiments of the invention, a thin (e.g., less than 10 μm in thickness) layer of another coating may be formed between the optical fiber and the primary coating, and/or between the primary coating and the secondary coating.

The optical fiber 22 is an uncoated optical fiber including a core and a cladding, as is familiar to the skilled artisan. The uncoated optical fiber may be a single mode fiber or a multimode fiber. The optical fiber may be adapted for use as a data transmission fiber (e.g., SMF-28®, LEAF®, and METROCOR®, each of which is available from Corning Incorporated of Corning, N.Y.). Alternatively, the optical fiber may perform an amplification, dispersion compensation, or polarization maintenance function on, or may be used in short lengths in coupling optical devices. The skilled artisan will appreciate that the coatings described herein are suitable for use with virtually any optical fiber for which protection from the environment is desired.

In coated optical fiber 20, optical fiber 22 is surrounded by a primary coating 24. In order to provide adequate cushioning and bend protection for the optical fiber, primary coating 24 has a Young's modulus about 5 MPa or less. Desirably, the primary coating has a Young's modulus of about 2 MPa or less. In certain especially desirable embodiments of the present invention, the primary coating has a Young's modulus of about 1.5 MPa or less, about 1 MPa or less, or even about 0.8 MPa. As used herein, the Young's modulus of a primary coating is measured using a tensile testing instrument (e.g., a Sintech MTS Tensile Tester, or an Instron Universal Material Test System) on a sample of material shaped as a film between about 0.003" (76 $\mu$m) and 0.004" (102 $\mu$m) in thickness and about 1.3 cm in width, with a gauge length of 5.1 cm, and a test speed of 2.5 cm/min. Desirably, the primary coating has a glass transition temperature more negative than about $-10°$ C.

Figure 2:
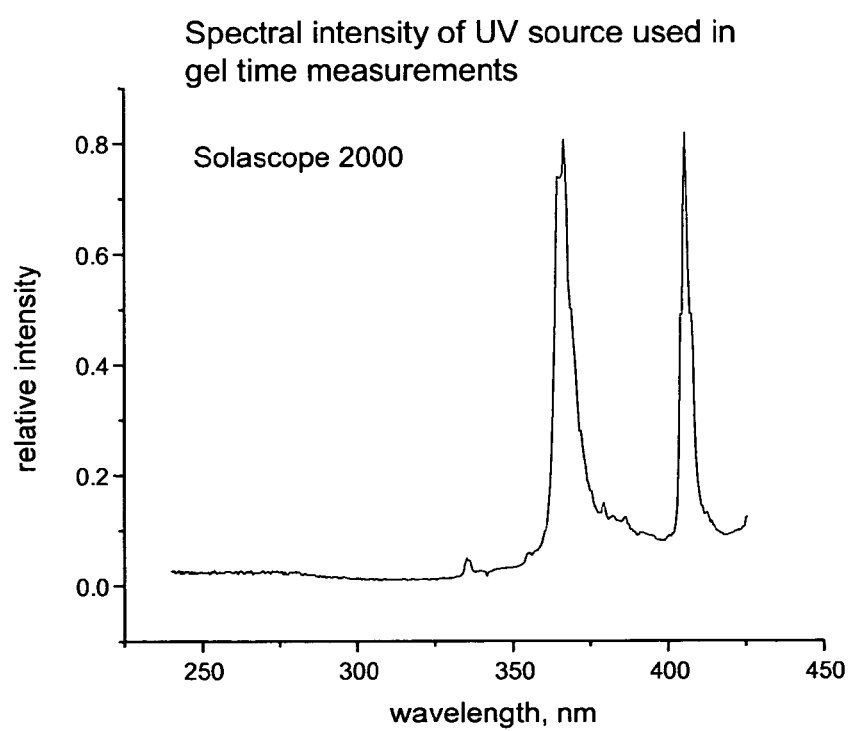
FIG. 2 is a plot showing the spectral output of the UV source used in gel time determinations.

Primary coating 24 is the cured reaction product of a primary curable composition having a short gel time. For example, in one embodiment of the present invention, the primary coating is the cured reaction product of a primary curable composition having a gel time less than about 1.4 seconds at a UV intensity of 3.4 mW/cm$^2$ between 325 nm and 425 nm (using a mercury vapor lamp operating near 365 nm, having the spectral output shown in FIG. 2). Desirably, the primary curable composition has a gel time less than about 1.2 seconds at a UV intensity of 3.4 mW/cm$^2$ between 325 nm and 425 nm. In another embodiment of the present invention, the primary coating is the cured reaction product of a primary curable composition having a gel time less than about 0.6 seconds at a UV intensity of 8.5 mW/cm$^2$ between 325 nm and 425 nm. Desirably, the primary curable composition has a gel time less than about 0.45 seconds at a UV intensity of 8.5 mW/cm$^2$ between 325 nm and 425 nm.

Figure 3:
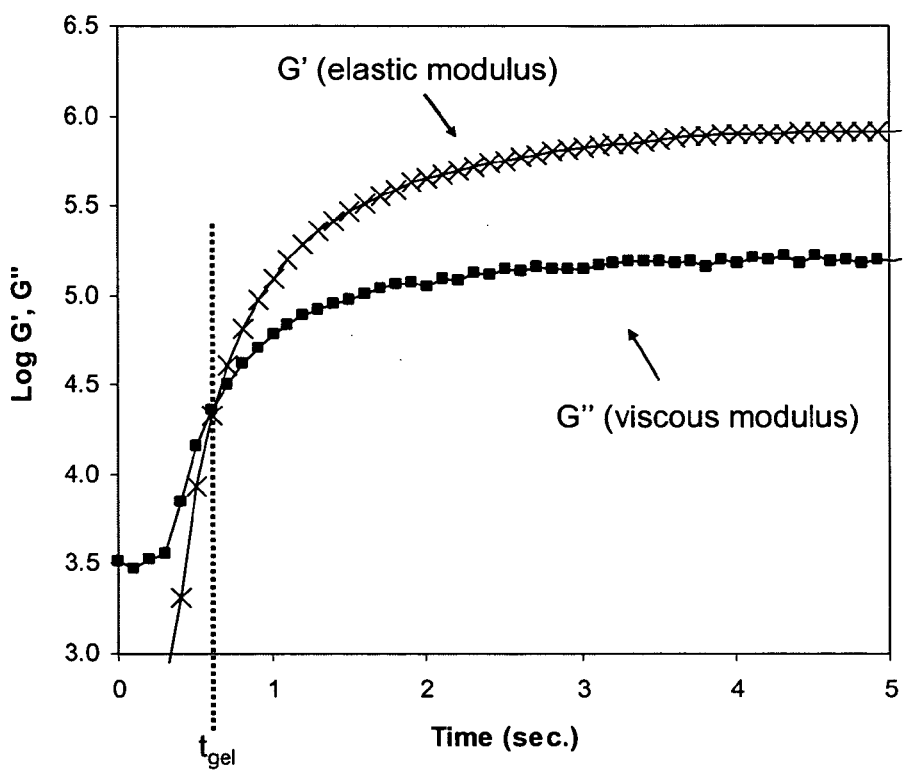
FIG. 3 is a typical plot of G' and G" vs. time used in determining the gel time of a curable composition.

As used herein, the gel time of a curable composition is defined as the time, under an exposure to a UV source of a given intensity, for a sample of the curable composition formed as a layer 25 $\mu$m in thickness to achieve a viscous modulus equal to its elastic modulus. This is shown graphically in FIG. 3. As time increases, the curable composition is cured by the exposure to UV, the viscous modulus G' increases, and the elastic modulus G" increases. At the gel time ($t_{gel}$ in FIG. 3), G' and G" have become equal. The gel time is measure of how quickly the curable composition forms a physically stable polymeric network, and so is highly related to the processability of the curable composition.

Figure 4:
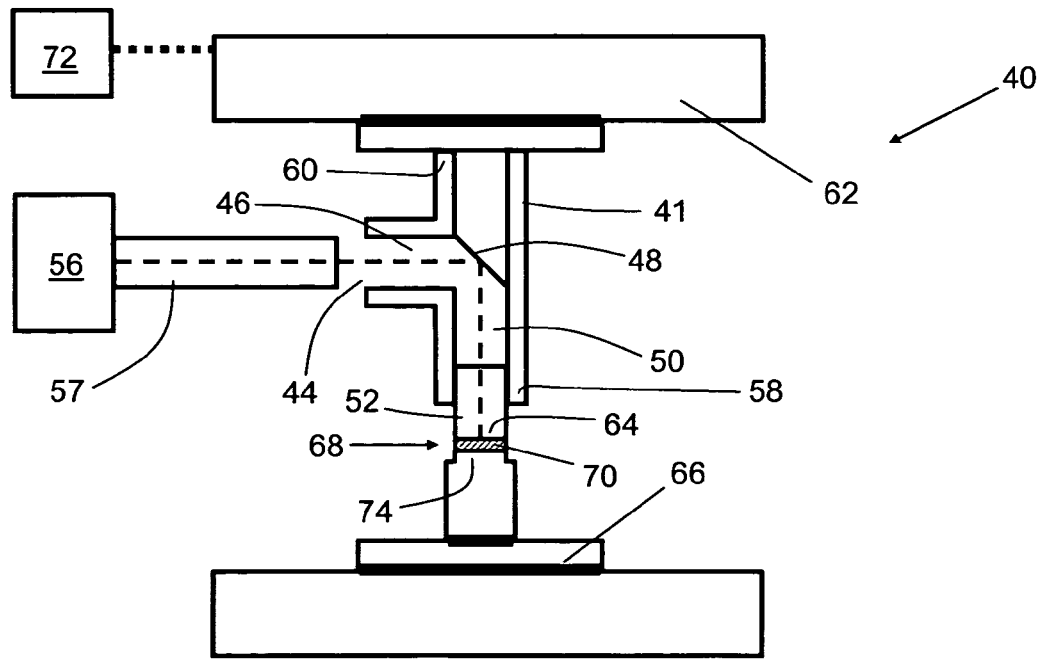
FIG. 4 is a schematic cross-sectional view of a dynamic photo-rheometry apparatus.

The gel time of a curable composition is determined using dynamic photo-rheometry, as described in Lee et al., "A rheological characterization technique for fast UV-curable systems," Progress in Organic Coatings 38, 193–97 (2000), which is hereby incorporated herein by reference in its entirety. A schematic view of a suitable photo-rheometry apparatus 40 is given in FIG. 4. Rheometer body 41 includes an opening 44 and a passage 46 through which a UV light source 56 is coupled (through liquid light guide 57) to a mirror 48, which is angled to couple light from UV light source 56 down the shaft 50 of rheometer body 41. A quartz cylinder 52 is attached to the proximal end 58 of rheometer body 41, and the distal end 60 of rheometer body 40 is coupled to a transducer 62. A suitable rheometer body 41 is the Rheometric RDA-II, available from Rheometric of Piscataway, N.J. The end 64 of the quartz cylinder 52 is mounted above an actuator 66, with a gap 68 formed therebetween. A sample 70 of the curable composition is filled into gap 68. While the sample 70 is cured using UV light from UV light source 56, the actuator 66 rotationally oscillates and dynamically shears sample 70 between the end 64 of quartz cylinder 52 and the plate 74 of actuator 66. The transducer 62 measures as a function of time during cure the torque exhibited by the sample in response to the oscillation of actuator 64. The transducer 62 is operatively coupled to data acquisition system 72 capable of acquiring torque and angular position at a rate of at least about 10 Hz and providing dynamic modulus, elastic modulus, and viscous modulus measurements continuously as the sample 70 cures.

In the gel time determination of the present invention, the rheometer is operated at room temperature at a frequency of 10 Hz and an oscillatory shear strain of about 30%. The UV light source is a GREEN SPOT UV spot curing source, available from UV Source Inc., of Torrance Calif., coupled to a liquid light guide configured to deliver the UV light to the sample. The gel time determinations used to test the curable compositions of the present invention were performed at UV intensities of 3.4 mW/cm$^2$ and 8.5 mW/cm$^2$. The intensity is determined by first measuring the UV intensity at the sample location using a SOLASCOPE 2000 (from 4D Controls Ltd., Redruth, Cornwall, UK). The measurement was made through a 0.3 neutral density filter, with the SOLASCOPE reading 17 mW/cm$^2$, meaning the actual unfiltered intensity at the sample location would be 34 mW/cm$^2$. Gel time determinations were performed with a 1.0 neutral density filter in place, giving an intensity of 3.4 mW/cm$^2$, or with a 0.6 neutral density filter in place, giving an intensity of 8.5 mW/cm$^2$. The thickness of the gap 68, and therefore of sample 70 was about 25 $\mu$m.

Primary coating 24 is desirably the cured reaction product of a primary curable composition having a spectroscopic cure speed of at least about 150%/second as determined by FTIR. More desirably, the primary curable composition has a spectroscopic cure speed of at least about 170%/second as determined by FTIR.

Figure 5:
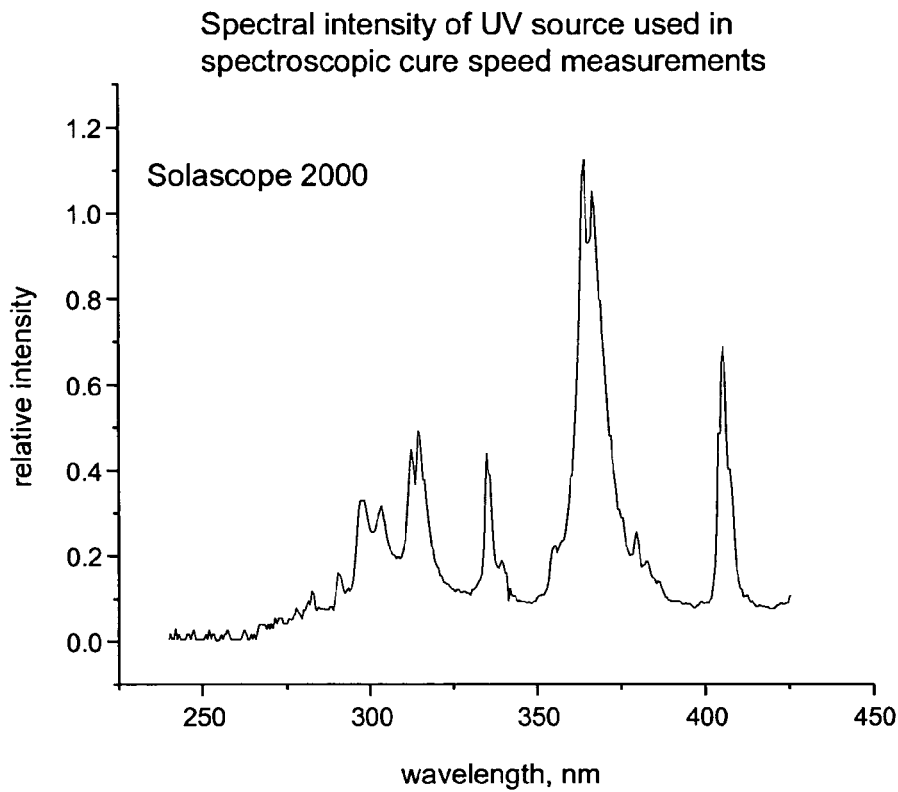
FIG. 5 is a plot showing the spectral output of the UV source used in spectroscopic cure speed determinations.
Figure 6:
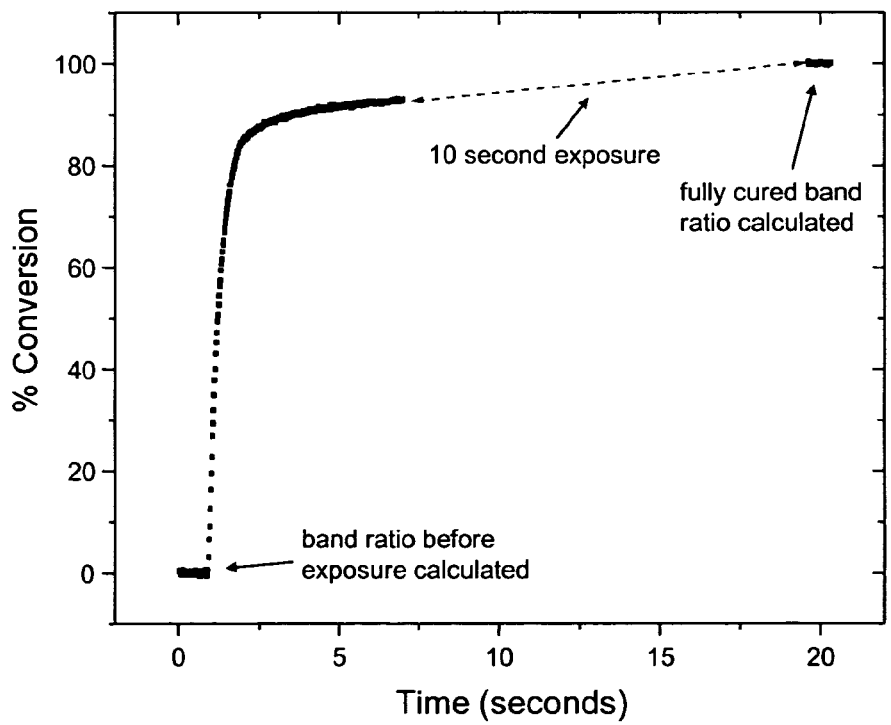
FIG. 6 is a typical plot of % conversion vs. time used in determining the spectroscopic cure speed of a curable composition.

The spectroscopic cure speed of a curable composition is determined by monitoring the acrylate bond conversion as a function of time using real time FTIR. The acrylate bond conversion is measured by monitoring the disappearance of an acrylate band at 1410 cm$^{-1}$, as integrated and ratioed to a theoretically unchanging reference band. In the experiments herein, the band at 1380 cm$^{-1}$ corresponding to a methyl group of the oligomeric backbone was used as the reference band; the skilled artisan will select an appropriate reference band when measuring other compositions. Films 25 $\mu$m in thickness were drawn directly on a 3-bounce diamond-coated ZnSe crystal in an ASI DURASAMPLIR accessory, and purged with nitrogen for 1 min. Mid-infrared spectra from 4000 cm$^{-1}$ to 650 cm$^{-1}$ were collected at 6 ms intervals using a Bruker IFS 66S spectrometer for 0.9 sec prior to UV exposure. UV radiation from a Lesco Mark II spot cure unit (Lightwave Energy Systems, Torrance, Calif.) was conducted through a liquid light guide to the sample. The UV intensity was measured to be 20 mW/cm$^2$ between 250 nm and 425 nm using a SOLASCOPE 2000. The spectral output of the Lesco Mark II spot cure unit is shown in FIG. 5. A shutter is used to control the dose at the sample. In the spectroscopic cure speed determinations described herein, the shutter was closed for the first 0.9 seconds in order to provide data for the determination of the band ratio before exposure. The shutter was opened and the sample irradiated for 1 second, then the shutter was closed for 7 seconds. Finally, the shutter was open and the sample irradiated for 10 seconds. FIG. 6 is a plot of % conversion vs. time for a typical spectroscopic cure speed determination. The % conversion is calculated as:

$$\% \text{ conversion} = \frac{\text{band ratio at time } t - \text{band ratio before exposure}}{\text{fully cured band ratio} - \text{band ratio before exposure}} \times 100\%.$$

The fully cured band ratio is the band ratio after the final 10 second exposure. The cure speed is calculated as the rate of % conversion in the linear region from 10% to 40% conversion.

The skilled artisan will appreciate that between different families of curable compositions, the relationship between gel time and spectroscopic cure speed can vary widely. For example, curable compositions that have different chemical makeup can have very different gel times, even if their spectroscopic cure speeds are similar. Further, as described in Gasper, S. M. et al., "Integrated Approach to Studying the Development and Final Network Properties of Urethane Acrylate Coatings," Polymer Preprints 44(1), 27 (2003), which is incorporated herein by reference in its entirety, the gel times of a series of related coating is not strictly related to their cure speeds. For example, a series of analogous coatings having increasing cure speeds can have decreasing gel times, or even increasing gel times.

Primary coating 24 desirably has a glass transition temperature lower than the lowest projected use temperature of the coated optical fiber. For example, the primary coating desirably has a glass transition temperature less than about −10° C. In especially desirable embodiments of the invention, the primary coating has a glass transition temperature of about −20° C. or less. Primary coating 24 desirably has a higher refractive index than the cladding of the optical fiber in order to allow it to strip errant optical signals away from the core of optical fiber 22. In a typical optical fiber used for long-distance transmission of optical signals, the refractive index values at a wavelength of 1550 nm for the core and cladding are 1.447 and 1.436, respectively; as such, for typical silica based optical fibers, it is desirable that the refractive index of the primary coating of be greater than 1.44 at 1550 nm. The primary coating should maintain adequate adhesion to the glass fiber during thermal and hydrolytic aging, yet be strippable therefrom for splicing purposes. The primary coating typically has a thickness in the range of 25–50 μm (e.g., about 32.5 μm). Primary coatings are typically applied to the optical fiber as a liquid and cured, as will be described in more detail hereinbelow.

The polymeric material used as the primary coating in the present invention may be the cured product of a primary curable composition including an oligomer and at least one monomer. As is conventional, the primary curable composition used in forming the primary coating may also include photoinitiators, antioxidants, and other additives familiar to the skilled artisan. In desirable embodiments of the invention, the oligomer and monomer(s) of the primary curable composition are ethylenically unsaturated. In especially desirable embodiments of the invention, the oligomer and monomer(s) of the primary curable composition are (meth) acrylate-based. The oligomer may be, for example, a urethane (meth)acrylate oligomer. However, as the skilled artisan will recognize, oligomers and monomers adapted for other curing chemistries, such as epoxy, vinyl ether, and thiol-ene, may be used in accordance with the present invention.

The skilled artisan will select monomers and oligomers that provide decreased gel times and low Young's moduli. For example, one especially desirable type of oligomer for use in providing curable compositions having decreased gel times and low moduli is a polyether urethane acrylate oligomer having a molecular weight between 3000 and 15000 Daltons. One especially desirable type of monomer for use in providing curable compositions having decreased gel times and low moduli is a monofunctional aliphatic epoxy acrylate monomer, such as lauryloxyglycidyl acrylate (e.g., CN130 available from Sartomer Company) and phenoxyglycidyl acrylate (e.g., CN131 available from Sartomer Company). It may be desirable to use the monofunctional aliphatic epoxy acrylate monomer at a concentration of 5–40 wt %. In certain especially desirable embodiments of the invention, the monofunctional aliphatic epoxy acrylate monomer is present in the primary curable composition in a concentration from 10–30 wt %. Another especially desirable type of monomer for use in providing curable compositions having decreased gel times and low moduli is a multifunctional (meth)acrylate. As used herein, multifunctional (meth)acrylates have two or more polymerizable (meth)acrylate moieties per molecule. In certain desirable embodiments of the invention the multifunctional (meth) acrylate has three or more polymerizable (meth)acrylate moieties per molecule. Examples of multifunctional (meth) acrylates include dipentaerythritol monohydroxy pentaacrylate (e.g., PHOTOMER 4399 available from Cognis); methylolpropane polyacrylates with and without alkoxylation such as trimethylolpropane triacrylate, ditrimethylolpropane tetraacrylate (e.g., PHOTOMER 4355, Cognis Corp.); alkoxylated glyceryl triacrylates such as propoxylated glyceryl triacrylate with propoxylation being 3 or greater (e.g., PHOTOMER 4096, Cognis Corp.); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, Cognis Corp., and SR399, Sartomer Company, Inc.). The multifunctional acrylate is desirably present in the primary curable composition at a concentration of 0.05–15 wt %. In certain especially desirable embodiments of the invention, the multifunctional (meth)acrylate monomer is present in the primary curable composition in a concentration from 0.1–10 wt %. Another desirable type of monomer for use in providing curable compositions having decreased gel times and low moduli is an N-vinyl amide, such as a N-vinyl lactam. Examples of N-vinyl amides include N-vinyl pyrrolidinone and N-vinyl caprolactam. It may be desirable to use the N-vinyl amide monomer at a concentration of 2–40 wt %. In certain especially desirable embodiments of the invention, the N-vinyl amide monomer is present in the primary curable composition in a concentration from 4–25 wt %.

Desirable acrylate-terminated oligomers for use in the primary curable compositions include BR3731, BR3741, BR582 and KWS4131, from Bomar Specialty Co.; polyether urethane acrylate oligomers (e.g., CN986, available from Sartomer Company); polyester urethane acrylate oligomers (e.g., CN966 and CN973, available from Sartomer Company; and BR7432, available from Bomar Specialty Co.); polyether acrylate oligomers (e.g., GENOMER 3456, available from Rahn AG); polyester acrylate oligomers (e.g., EBECRYL 80, 584 and 657, available from UCB Radcure); and epoxy acrylate oligomers (e.g., CN120, available from Sartomer Company, and EBECRYL 3201 and 3604, available from UCB Radcure). Other oligomers are described in U.S. Pat. Nos. 4,609,718; 4,629,287; and 4,798,852, each of which is incorporated herein by reference. The above described oligomers may be used singly, or in combination, as the skilled artisan would readily appreciate. The oligomer of the primary curable composition is desirably selected to provide the primary coating with the desired glass transition temperature and tensile properties. One type of desirable oligomer for use in the primary curable composition is an oligomer having a soft block having $M_n$ of about 4000 Daltons or greater. Examples of such oligomers are described in U.S. patent application Ser. No. 09/916,536, which is incorporated herein by reference in its entirety. Oligomers that are especially desirable for use in the primary coating compositions of the present invention have flexible backbones, low polydispersities, and low crosslink densities.

The total oligomer content of the primary curable composition may be between about 5 wt % and about 95 wt %. Desirably, the total oligomer content of the primary curable composition is between about 25 wt % and about 75 wt %. In certain embodiments of the invention, the oligomer content of the primary curable composition is between about 40 wt % and about 60 wt %.

The monomer component of the primary curable composition is generally selected to be compatible with the oligomer, to provide a low viscosity formulation, and to increase the refractive index of the primary coating. One group of suitable monomers for use in the monomer component includes ethoxylated acrylates, ethoxylated alkylphenol monoacrylates, propylene oxide acrylates, n-propylene oxide acrylates, iso-propylene oxide acrylates, monofunctional acrylates, multifunctional acrylates, and combinations thereof. Especially preferred monomers include $R_2-R_1-O-(CH_2CH_3CH-O)_n-COCH=CH_2$, where $R_1$ and $R_2$ are aliphatic, aromatic, or a mixture of both, and n=1 to 10, and $R_1-O-(CH_2CH_3CH-O)_n-COCH=CH_2$, where $R_1$ is aliphatic or aromatic, and n=1 to 10. Specific examples include ethlylenically unsaturated monomers including lauryl acrylate (e.g., SR335 available from Sartomer Company, Inc., AGEFLEX FA 12 available from CPS Chemical Co. (Old Bridge, N.J.), and PHOTOMER 4812 available from Cognis (Ambler, Pa.)), ethoxylated nonylphenol acrylate (e.g., SR504 available from Sartomer Company, Inc. and PHOTOMER 4003 available from Cognis), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from CPS Chemical Co., and PHOTOMER 4035 available from Cognis), isooctyl acrylate (e.g., SR440 available from Sartomer Company, Inc. and AGEFLEX FA8 available from CPS Chemical Co.), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyethoxy)ethyl acrylate (e.g., SR256 available from Sartomer Company, Inc.), and combinations thereof.

In certain embodiments of the invention, it may be desirable to use a hydroxyfunctional monomer in the primary curable composition. A hydroxyfunctional monomer is a monomer that has a pendant hydroxy moiety in addition to an oligomer-reactive functionality (e.g., acrylate). Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, polypropylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich). The hydroxyfunctional monomer is desirably present in an amount sufficient to improve adhesion of the primary coating to the optical fiber. For example, the hydroxyfunctional monomer may be present in an amount between about 0.1 wt % and about 25 wt % of the primary curable composition. Desirably, the hydroxyfunctional monomer is present in an amount between about 0.5 wt % and about 8 wt % of the primary curable composition. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. patent application Ser. No. 09/712,565, which is incorporated herein by reference.

The total monomer content of the primary curable composition may be between about 5 wt % and about 95 wt %. Desirably, the total monomer content of the primary curable composition is between about 25 wt % and about 65 wt %. In certain embodiments of the invention, the monomer content of the primary curable composition is between about 35 wt % and about 55 wt %.

Through variation of the oligomers, and the polyols from which they are based, coatings having the desired properties (e.g., $T_g$, modulus, elongation) can be prepared in accordance with the present disclosure. The mechanical properties of these coatings can be adjusted by the choice of the oligomer and the monomer component. In order to provide curable compositions with a viscosity that is in a range suitable for processing, the viscous oligomers may be diluted with low viscosity, radiation curable monomers with which the oligomers are compatible. In certain embodiments of the invention, it maybe desirable for the oligomers and monomers to be chosen to provide a hydrophilic primary coating, as suggested in U.S. patent application Ser. No. 10/675,720, entitled "COATED OPTICAL FIBER AND OPTICAL FIBER COATING SYSTEM INCLUDING A HYDROPHILIC PRIMARY COATING," which is hereby incorporated by reference in its entirety.

In addition, according to the Fox equation, the ultimate glass transition temperature of a cured coating will be a function of the glass transition temperatures of the components of the coating formulation from which it is made. Thus, a desirable monomer in an optical fiber coating would be a low viscosity material with a low homopolymer glass transition temperature, which can readily dissolve the oligomer and which does not negatively impact the mechanical properties of the cured coating. In addition to low $T_g$ and suitable viscosity, the selection of the oligomer and monomer combinations may be influenced by other desirably properties for optical fibers. These additional properties include suitably high refractive index, good optical clarity, low oil sensitivity, high thermal and light resistance, low extractable content, and fast cure.

The primary curable composition may also contain a polymerization initiator which is suitable to cause polymerization (i.e., curing) of the composition after its application to an optical fiber. Polymerization initiators suitable for use in the primary curable compositions of the present invention include thermal initiators, chemical initiators, electron beam initiators, and photoinitiators. Particularly preferred are the photoinitiators. For most acrylate-based coating formulations, conventional photoinitiators, such as ketonic photo-initiating and/or phosphine oxide additives, are preferred. When used in the compositions of the present invention, the photoinitiator is present in an amount sufficient to provide rapid ultraviolet curing.

Suitable photoinitiators include 1-hydroxycyclohexylphenyl ketone (e.g., IRGACURE 184 available from Ciba Specialty Chemical (Hawthorne, N.Y.); bis(2,6-dimethoxybenzoyl)-2,4,4-trimethylpentylphosphine oxide (e.g., commercial blends IRGACURE 1800, 1850, and 1700 available from Ciba Specialty Chemical); 2,2-dimethoxy-2-phenylacetophenone (e.g., IRGACURE 651, available from Ciba Specialty Chemical); bis(2,4,6-trimethylbenzoyl)phenylphosphine oxide (IRGACURE 819); (2,4,6-trimethylbenzoyl)diphenyl phosphine oxide (LUCERIN TPO, available from BASF (Munich, Germany)); ethoxy(2,4,6-trimethylbenzoyl)phenylphosphine oxide (LUCERIN TPO-L from BASF); and combinations thereof.

The total photoinitiator content of the primary curable composition may be up to about 10 wt %. Desirably, the total photoinitiator content of the primary curable composition is between about 0.5 wt % and about 6 wt %. The photoinitiator component of the primary curable composition may consist of a single photoinitiator; alternatively, two or more photoinitiators may be combined to lend a desired curing property to the primary curable composition. For example, a combination of IRGACURE 819 and IRGACURE 184 may be used to ensure adequate surface cure as well as complete cure of the bulk primary coating material.

The photoinitiator, when used in a small but effective amount to promote radiation cure, provides reasonable cure speed without causing premature gelation of the coating composition. A preferred dosage for coating thicknesses of about 25–35 μm is, for example, less than about 1.0 J/cm$^2$, preferably less than about 0.5 j/cm$^2$.

As used herein, the weight percent of a particular component in a curable composition refers to the amount introduced into the bulk curable composition excluding an additional adhesion promoter and other additives. The amount of additional adhesion promoter and various other additives that are introduced into the curable composition to produce a composition of the present invention is listed in parts per hundred. For example, a monomer, oligomer, and photoinitiator are combined to form the curable composition such that the total weight percent of these components equals 100 percent. To this bulk curable composition, an amount of an additional adhesion promoter, for example 1.0 part per hundred, can be employed in excess of the 100 weight percent of the bulk composition.

It may be desirable to include an adhesion promoter in the primary curable composition. In one embodiment of the present invention, an adhesion promoter is present in the primary curable composition in an amount between about 0.02 to about 10 parts per hundred, more preferably between about 0.05 to about 4 parts per hundred, most preferably between about 0.1 to about 2 parts per hundred. In certain embodiments of the present invention, the adhesion promoter is present in an amount of about 0.1 to about 1 pph. Suitable adhesion promoters include alkoxysilanes, organotitanates, and zirconates. Preferred adhesion promoters include 3-mercaptopropyltrialkoxysilane (e.g., 3-MPTMS, available from United Chemical Technologies (Bristol, Pa.)), bis(trialkoxysilylethyl)benzene, acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from Gelest (Tullytown, Pa.)); see U.S. Pat. No. 6,316,516, issued Nov. 13, 2001, which is hereby incorporated by reference in its entirety. The skilled artisan may use other conventional adhesion promoters in the primary curable compositions used in the present invention.

In addition to the above-described components, the primary curable composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary curable composition. Others can affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, each of which is hereby incorporated herein by reference.

The primary coating composition may also include a strength additive, as described in U.S. patent application Ser. No. 10/077,166, which is hereby incorporated herein by reference in its entirety. Desirable strength additives include mercapto-functional compounds, such as N-(tert-butoxycarbonyl)-L-cysteine methyl ester; pentaerythritol tetrakis(3-mercaptopropionate); (3-mercaptopropyl)-trimethoxysilane; (3-mercaptopropyl)trimethoxysilane; and dodecyl mercaptan. The strength additive is desirably present in the primary curable composition in an amount less than about 1 pph. More desirably, the strength additive is present in the primary curable composition in an amount less than about 0.5 pph. In certain embodiments of the invention, the strength additive is present in the primary curable composition in an amount between about 0.01 pph and about 0.1 pph.

A preferred antioxidant is thiodiethylene bis(3,5-di-tert-butyl)-4-hydroxyhydrocinnamate) (e.g., IRGANOX 1035, available from Ciba Specialty Chemical).

The composition can further include additional additives such as waxes, lubricants, slip agents, as well as other additives known in the art.

Certain additives may be useful in providing primary curable compositions having decreased gel times and low moduli. For example, it may be desirable for the skilled artisan to include in the primary curable composition an optical brightener, such as UVITEX OB, available from Ciba; Blankophor KLA, available from Bayer; bisbenzoxazole compounds; phenylcoumarin compounds; and bis(styryl)biphenyl compounds. The optical brightener is desirably present in the primary curable composition at a concentration of 0.005–0.3 pph. It may also be desirable to include in the primary curable composition an amine synergist, such as triethanolamine; 1,4-diazabicyclo[2.2.2]octane (DABCO); methyldiethanolamine; and triethylamine. The amine synergist is desirably present in the primary curable composition at a concentration of 0.02 pph–0.5 pph.

In coated optical fiber 20 of FIG. 1, primary coating 24 is surrounded by secondary coating 26. While in FIG. 1, the secondary coating is shown as being applied directly to the primary coating, the skilled artisan will recognize that in alternative embodiments of the invention there may be one or more intermediate coating layers deposited between the primary coating and the secondary coating. Secondary coating 26 is formed from a cured polymeric material, and typically has a thickness in the range of 20–35 μm (e.g., about 27.5 μm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating). While the coated optical fiber 20 of FIG. 1 includes a secondary coating, the skilled artisan will appreciate that the coated optical fibers of the present invention need not have a secondary coating; they may include an optical fiber and a primary coating, but lack a secondary coating. Suitable secondary coatings may be found for example, in U.S. patent application Ser. No. 10/840,454, entitled "OPTICAL FIBER COATING SYSTEM AND COATED OPTICAL FIBER"; and U.S. patent application Ser. No. 10/454,984, entitled "COATED OPTICAL FIBER, METHOD FOR MAKING COATED OPTICAL FIBER, AND CURABLE COMPOSITIONS FOR COATING OPTICAL FIBER," each of which is hereby incorporated herein by reference in its entirety. Secondary curable compositions having low oligomer content are described in more detail in U.S. patent application Ser. No. 09/722,895, which is incorporated herein by reference in its entirety. Other suitable materials for use in secondary coating materials, as well as considerations related to selection of these materials, are well known in the art and are described in U.S. Pat. Nos. 4,962,992 and 5,104,433 to Chapin, which are hereby incorporated herein by reference.

Another embodiment of the present invention relates to a method of making an optical fiber including the primary coating described hereinabove. This method can generally be performed by standard methods with the use of a coating system of the present invention. For example, a method according to one embodiment of the present invention includes the steps of providing a bare optical fiber (e.g., fabricated using methods familiar to the skilled artisan), coating the optical fiber with a primary curable composition having a gel time less than about 1.4 seconds at a UV intensity of 3.4 mW/cm$^2$; and curing the primary curable composition to form a primary coating encapsulating the optical fiber, the primary coating having a Young's modulus less than about 5 MPa. In order to provide an optical fiber having both primary and secondary coatings, it may be desirable to apply a secondary curable composition to the coated glass fiber, and polymerize the secondary curable composition to form the secondary coating of the optical fiber. Optionally, the secondary curable composition can be applied to the coated fiber before polymerizing the primary curable composition, in which case only a single polymerization step is employed.

The primary and secondary curable compositions are coated on an optical fiber using conventional processes, for example, on a draw tower. It is well known to draw glass optical fibers from a specially prepared, cylindrical preform which has been locally and symmetrically heated to a temperature, e.g., of about 2000° C. As the preform is heated, such as by feeding the preform into and through a furnace, a glass optical fiber is drawn from the molten material. One or more curable compositions are applied to the glass fiber after it has been drawn from the preform, preferably immediately after cooling. The curable compositions are then cured to produce the coated optical fiber. The method of curing can be thermal, chemical, or radiation induced, such as by exposing the applied (and uncured) curable composition on the glass fiber to ultraviolet light, actinic radiation, microwave radiation, or electron beam, depending upon the nature of the coating composition(s) and polymerization initiator being employed. It is frequently advantageous to apply both a primary curable composition and any secondary curable compositions in sequence following the draw process. One method of applying dual layers of curable compositions to a moving glass fiber is disclosed in U.S. Pat. No. 4,474,830 to Taylor, which is hereby incorporated by reference. Another method for applying dual layers of curable compositions onto a glass fiber is disclosed in U.S. Pat. No. 4,585,165 to Rannell et al., which is hereby incorporated by reference. Of course, the primary curable composition can be applied and cured to form the primary coating material, then the secondary curable composition can be applied and cured to form the cured polymeric material of the secondary coating.

The coated optical fibers of the present invention are suitable for use in optical fiber ribbons and cables. As such, another embodiment of the present invention relates to an optical fiber ribbon including at least one coated optical fiber as described hereinabove. Another embodiment of the present invention relates to an optical fiber cable including at least one coated optical fiber as described hereinabove.

Another embodiment of the present invention relates to a curable composition having a gel time less than about 1.4 seconds at a UV intensity of 3.4 mW/cm$^2$, wherein a substantially cured reaction product of the curable composition has a Young's modulus less than about 5 MPa. The curable composition according to this embodiment of the invention is substantially as described above with respect to the primary curable composition used to make the coated optical fibers of the present invention. In one especially desirable embodiment of the invention, the curable composition comprises a polyether or polyester urethane (meth)acrylate oligomer, and a monofunctional epoxy acrylate, desirably in the concentrations described above. The curable composition may also include an optical brightener and/or an amine synergist, also desirably in the concentrations described above.

EXAMPLES

The present invention is further described by the following non-limiting examples.

Example 1

Primary curable compositions 1–8 and comparative primary curable composition C1 were formulated using a high-speed mixer in an appropriate container heated to 70° C. with a heating band or heating mantle. In each case, the components were weighed into the container using a balance and allowed to mix until the solid components were thoroughly dissolved and the mixture appeared homogeneous. Curable compositions are formulated such that the amounts of oligomer, monomer, and photoinitiator total 100 wt %; other additives are added to the total mixture in units of pph. BR3731, BR3741 and BR 582 are oligomers available from Bomar Specialties. PHOTOMER 4003 is an ethoxylated nonylphenol acrylate monomer available from Cognis. N-vinyl pyrrolidinone and N-vinyl caprolactam are available from Aldrich. CN130 is a lauryloxyglycidyl acrylate monomer available from Sartomer Company. IRGACURE 819 and IRGACURE 1850 are photoinitiators available from Ciba Specialty Chemical. IRGANOX 1035 is an antioxidant available from Ciba. Bis(trimethoxysilylethyl)benzene and 3-acryloxypropyltrimethoxysilane are an adhesion promoters available from Gelest. PHOTOMER 4399 is a dipentaerythritol monohydroxy pentaacrylate monomer available from Cognis. UVITEX OB is an optical brightener available from Ciba. Triethanolamine is available from Fisher Scientific. The oligomer and monomer(s) were blended together for at least one hour at 70° C. Photoinitiator(s) and additives were then added, and blending was continued for one hour. Finally, after cooling to room temperature the adhesion promoter was added, and blending was continued for 30 minutes. The components used to formulate primary curable compositions 1–8 and comparative primary curable composition C1 are detailed below in Table 1.

Primary curable compositions 1–8 and comparative primary curable composition C1 were cured into films for testing of mechanical properties. Wet films were cast on silicone release paper with the aid of a draw-down box having an about 0.005" gap thickness. Films were cured using a Fusion Systems UV curing apparatus with a 600 W/in D-bulb (50% power, 10 ft/mm belt speed, nitrogen purge) to yield primary coatings 1–8 and comparative primary coatings C1 in film form. Cured film thickness was between about 0.003" and 0.004".

The films were allowed to age (23° C., 50% relative humidity) for at least 16 hours prior to testing. Film samples were cut to a specified length and width (about 15 cm× about 1.3 cm). Young's modulus, tensile strength at break, and elongation at break were measured using a Sintech tensile tester. Films were tested at an elongation rate of 2.5 cm/min starting from an initial jaw separation of 5.1 cm. Glass transition temperatures of the cured films were determined by determining the peak of the tan δ curves measured on a Seiko-5600 DMS in tension at a frequency of 1 Hz. Thermal and mechanical properties (tested in accordance with ASTM 82–997) of the cured films are reported in Table 2, below.

TABLE 2

| Primary Coating | Young's modulus (MPa) | Tensile Strength (MPa) | elongation at break (%) | $T^g$ (° C.) |
| --- | --- | --- | --- | --- |
| 1 | 1.68 | 0.66 | 76 | −27.1 |
| 2 | 1.68 | 0.69 | 79 | −28.7 |
| 3 | 4.80 | 4.39 | 78 | −11.7 |
| 4 | ND | ND | ND | −13.8 |
| 5 | 0.77 | 0.58 | ND | ND |
| 6 | 0.65 | 0.62 | ND | −26 |
| 7 | 0.64 | 0.49 | ND | −15 |
| 8 | 0.67 | 0.53 | ND | −26 |
| C1 | 5.42 | 1.50 | 43 | −7.0 |

ND = not determined

Gel times and spectroscopic cure speeds for primary curable compositions 1–8 and comparative primary curable

TABLE 1

| | Primary Curable Composition | | | | | | | | |
| --- | --- | --- | --- | --- | --- | --- | --- | --- | --- |
| Component | 1 | 2 | 3 | 4 | 5 | 6 | 7 | 8 | C1 |
| BR 3731 (wt %) | 52 | 52 | 52 | 52 | 0 | 0 | 0 | 0 | 0 |
| BR 3741 (wt %) | 0 | 0 | 0 | 0 | 52 | 52 | 52 | 52 | 0 |
| BR 582 (wt %) | 0 | 0 | 0 | 0 | 0 | 0 | 0 | 0 | 55 |
| PHOTOMER 4003 (wt %) | 26 | 26 | 26 | 26 | 25 | 40 | 25 | 40 | 0 |
| CN130 (wt %) | 20 | 20 | 20 | 20 | 0 | 0 | 0 | 0 | 42 |
| N-vinyl pyrollidinone (wt %) | 0 | 0 | 0 | 0 | 20 | 5 | 0 | 0 | 0 |
| N-vinyl caprolactam (wt %) | 0 | 0 | 0 | 0 | 0 | 0 | 20 | 5 | 0 |
| IRGACURE 1850 (wt %) | 0 | 0 | 0 | 0 | 0 | 0 | 0 | 0 | 3 |
| IRGACURE 819 (wt %) | 2 | 2 | 2 | 2 | 1.5 | 1.5 | 1.5 | 1.5 | 0 |
| IRGACURE 184 (wt %) | 0 | 0 | 0 | 0 | 1.5 | 1.5 | 1.5 | 1.5 | 0 |
| IRGANOX 1035 (pph) | 0 | 0 | 0 | 0 | 1 | 1 | 1 | 1 | 1 |
| bis(trimethoxysilylethyl)benzene (pph) | 0 | 0 | 0 | 0 | 0 | 0 | 0 | 0 | 1 |
| 3-acryloxypropyltrimethoxysilane (pph) | 0 | 0 | 0 | 0 | 1 | 1 | 1 | 1 | 0 |
| PHOTOMER 4399 (pph) | 0 | 0 | 5 | 5 | 0 | 0 | 0 | 0 | 0 |
| UVITEX OB (pph) | 0 | 0.05 | 0 | 0 | 0 | 0 | 0 | 0 | 0 |
| triethanolamine (pph) | 0 | 0 | 0 | 0.1 | 0 | 0 | 0 | 0 | 0 | composition C1 were determined using the test methods described above. Gel times at UV intensities of 3.4 mW/cm$^2$ and 8.5 W/cm$^2$ are given in Table 3, below. Gel times are averages of two runs, and spectroscopic cure speeds are averages of two runs.

TABLE 3

| Primary Curable Composition | 3.4 mW/cm$^2$ | | 8.5 mW/cm$^2$ | | Spectroscopic cure speed | |
|---|---|---|---|---|---|---|
| | Gel time (sec) | Std. dev (sec) | Gel time (sec) | Std. dev. (sec) | Cure speed (%/sec) | Std. dev. (%/sec) |
| 1 | 1.27 | 0.05 | 0.52 | 0.05 | 177 | 2 |
| 2 | 1.02 | 0.05 | 0.43 | 0.05 | 188 | 2 |
| 3 | 1.17 | 0.08 | 0.55 | 0.13 | 223 | 10 |
| 4 | 1.04 | 0.05 | 0.45 | 0.07 | 223 | 15 |
| 5 | ND | ND | 0.20 | 0.05 | ND | ND |
| 6 | ND | ND | 0.31 | 0.05 | ND | ND |
| 7 | ND | ND | 0.24 | 0.05 | ND | ND |
| 8 | ND | ND | 0.42 | 0.05 | ND | ND |
| C1 | 2.28 | 0.08 | 0.96 | 0.04 | 207 | 4 |

While the cure speed of comparative primary coating composition C1 is comparable to that of primary curable compositions 1–8, the gel times of primary curable compositions 1–8 are shorter than that of comparative primary coating composition C1. The optical brightener and triethanolamine additives appear to be effective at shortening the gel time.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A coated optical fiber comprising:
    an optical fiber having a core and a cladding; and
    a primary coating encapsulating the optical fiber, the primary coating having a Young's modulus of about 5 MPa or less, the primary coating being the cured reaction product of a primary curable composition having a gel time less than about 1.4 seconds at a UV intensity of 3.4 mW/cm$^2$.

2. The coated optical fiber of claim 1, wherein the primary curable composition has a gel time less than about 0.6 seconds at a UV intensity of 8.5 mW/cm$^2$.

3. The coated optical fiber of claim 1, wherein the primary curable composition has a gel time less than about 0.45 seconds at a UV intensity of 8.5 mW/cm$^2$.

4. The coated optical fiber of claim 1, wherein the primary curable composition has a gel time less than about 1.2 seconds at a UV intensity of 3.4 mW/cm$^2$.

5. The coated optical fiber of claim 1, wherein the primary coating has a Young's modulus less than about 2 MPa.

6. The coated optical fiber of claim 1, wherein the primary curable composition has a spectroscopic cure speed of at least about 150%/second as determined by FTIR.

7. The coated optical fiber of claim 1, wherein the primary curable composition comprises a polyether or polyester urethane (meth)acrylate oligomer.

8. The coated optical fiber of claim 1, wherein the primary curable composition comprises a monofunctional epoxy acrylate.

9. The coated optical fiber of claim 1, wherein the primary curable composition comprises a multifunctional (meth) acrylate.

10. The coated optical fiber of claim 1, wherein the primary curable composition includes an N-vinyl amide.

11. The coated optical fiber of claim 1, wherein the primary curable composition comprises an optical brightener.

12. The coated optical fiber of claim 1, wherein the primary curable composition comprises an amine synergist.

13. The coated optical fiber of claim 1, wherein the primary coating has a glass transition temperature more negative than about −10° C.

14. The coated optical fiber of claim 1, further comprising a secondary coating encapsulating the primary coating.

15. An optical fiber ribbon comprising at least one of the coated optical fibers of claim 1.

16. An optical fiber cable comprising at least one of the coated optical fibers of claim 1.

17. A method for coating an optical fiber comprising the steps of:
    providing a bare optical fiber;
    coating the optical fiber with a primary curable composition having a gel time less than about 1.4 seconds at a UV intensity of 3.4 mW/cm$^2$; and
    curing the primary curable composition to form a primary coating encapsulating the optical fiber, the primary coating having a Young's modulus less than about 5 MPa.

18. The method of claim 17, wherein the coating and curing steps are performed at a process speed of greater than about 20 m/s.

19. The method of claim 17, wherein the primary curable composition has a spectroscopic cure speed of at least about 150%/second as determined by FTIR.

20. A curable composition having a gel time less than about 1.4 seconds at a UV intensity of 3.4 mW/cm$^2$, wherein a substantially cured reaction product of the curable composition has a Young's modulus less than about 5 MPa.

21. The curable composition of claim 20, wherein the curable composition comprises a polyether or polyester urethane (meth) acryl ate oligomer, and a monofunctional epoxy acrylate.

22. The curable composition of claim 20, wherein the curable composition includes an optical brightener.

23. The curable composition of claim 20, wherein the curable composition includes an amine synergist.

24. The curable composition of claim 20, wherein the curable composition includes an N-vinyl amide.

* * * * *